United States Patent
Sigmund

(10) Patent No.: US 7,168,069 B1
(45) Date of Patent: Jan. 23, 2007

(54) DYNAMIC GENERATION OF MULTIMEDIA CODE FOR IMAGE PROCESSING

(75) Inventor: Ulrich Sigmund, Karlsruhe (DE)

(73) Assignee: STMicroelectronics, Inc., Carrollton, TX (US)

( * ) Notice: Subject to any disclaimer, the term of this patent is extended or adjusted under 35 U.S.C. 154(b) by 362 days.

(21) Appl. No.: 09/614,635

(22) Filed: Jul. 12, 2000

(51) Int. Cl.
*G06F 9/45* (2006.01)

(52) U.S. Cl. .................. 717/140; 171/136; 171/144

(58) Field of Classification Search ........ 717/136–147, 717/106–109
See application file for complete search history.

(56) References Cited

U.S. PATENT DOCUMENTS

| | | | |
|---|---|---|---|
| 4,667,290 A * | 5/1987 | Goss et al. ............... 717/147 |
| 4,951,194 A | 8/1990 | Bradley et al. |
| 5,307,492 A * | 4/1994 | Benson .................... 717/159 |
| 5,590,331 A * | 12/1996 | Lewis et al. ............. 717/144 |
| 5,696,974 A * | 12/1997 | Agrawal et al. .......... 717/152 |
| 5,703,887 A | 12/1997 | Heegard et al. |
| 5,708,473 A | 1/1998 | Mead |
| 5,758,075 A | 5/1998 | Graziano et al. |
| 5,778,180 A | 7/1998 | Gentry et al. |
| 5,819,088 A * | 10/1998 | Reinders .................. 717/149 |
| 5,835,773 A * | 11/1998 | Dunn ....................... 717/158 |
| 5,850,258 A | 12/1998 | Kang |
| 5,854,927 A * | 12/1998 | Gelissen .................. 717/139 |
| 5,875,442 A | 2/1999 | Jordan, II et al. |
| 5,938,734 A | 8/1999 | Yao et al. |
| 5,966,534 A | 10/1999 | Cooke et al. |
| 6,049,668 A * | 4/2000 | Smith et al. ............. 717/138 |
| 6,058,143 A | 5/2000 | Golin |
| 6,061,770 A | 5/2000 | Franklin |
| 6,081,846 A | 6/2000 | Hyder et al. |
| 6,081,883 A | 6/2000 | Popelka et al. |
| 6,170,075 B1 | 1/2001 | Schuster et al. |
| 6,226,769 B1 | 5/2001 | Schuster et al. |
| 6,247,071 B1 | 6/2001 | Cardoso, Jr. |
| 6,269,484 B1 | 7/2001 | Simsic et al. |
| 6,282,243 B1 | 8/2001 | Kazui et al. |
| 6,285,713 B1 | 9/2001 | Nakaya et al. |

(Continued)

FOREIGN PATENT DOCUMENTS

EP 0903944 3/1994

(Continued)

OTHER PUBLICATIONS

"Exploiting SIMD Parallelism in DSP and Multimedia Algorithms Usins the AltiVec Technology", Nguyen, Huy and John, Lizy Kurian, 1999, ACM Press, Proceedings of the 13th international conference on Supercomputing, pp. 11-20.*

(Continued)

*Primary Examiner*—Kakali Chaki
*Assistant Examiner*—William H. Wood
(74) *Attorney, Agent, or Firm*—Michael A. Glenn; Lisa K. Jorgenson

(57) ABSTRACT

A method and apparatus for processing multimedia instruction enhanced data by the use of an abstract routine generator and a translator. The abstract routine generator takes the multimedia instruction enhanced data and generates abstract routines to compile the multimedia instruction enhanced data. The output of the abstract generator is an abstract representation of the multimedia instruction enhanced data. The translator then takes the abstract representation and produces code for processing.

18 Claims, 1 Drawing Sheet

U.S. PATENT DOCUMENTS

| | | | |
|---|---|---|---|
| 6,295,376 B1 | 9/2001 | Nakaya et al. | |
| 6,357,039 B1* | 3/2002 | Kuper | 717/136 |
| 6,473,897 B1* | 10/2002 | Ansari et al. | 717/136 |
| 6,490,673 B1* | 12/2002 | Heishi et al. | 712/213 |
| 6,493,467 B1* | 12/2002 | Okuda et al. | 382/260 |
| 6,502,115 B2* | 12/2002 | Abdallah et al. | 708/204 |

FOREIGN PATENT DOCUMENTS

| | | |
|---|---|---|
| EP | 0712249 | 5/1996 |
| EP | 0 735 467 A | 10/1996 |
| EP | 0735769 | 10/1996 |
| EP | 0914009 | 10/1998 |
| EP | 0948214 | 3/1999 |
| EP | 0710027 | 5/2001 |
| JP | 02000112849 | 4/2000 |
| WO | 95/35628 | 12/1995 |
| WO | 98/43167 | 10/1997 |
| WO | 99/10811 | 3/1999 |

OTHER PUBLICATIONS

Aho et al.; "Compilers: Priciples, Techniques, and Tools"; 1986; Addison Wesley Longman; pp. 1-24.*

"Dictionary of Computing", Fourth Edition; Oxford University Press, 1996; pp. 149.*

Foley et al., "Computer Graphics: Principles and Practice" 1987, Cornell University.

"Pipeline Vectorization for Reconfigurable Systems"; Field-Programmable Custom Computing Machines 1999, FCCM '99, Proceedings; 7th Annual IEEE Symposium on Napa Valley, CA Apr. 1999.

"Macro-based Hardware Compilation of Java<TM> bytecodes Into a Dynamic Reconfigurable Computing System"; Filed-Programmable Custom Computing Machines 1999. Proceedings; Napa Valley Apr. 1999.

"The Long and Winding Road to High-Performance Image Processing with MMX/SSE"; Computer Architectures for Mahcine Perception, 2000. Proceedings. Fifth IEEE International Workshop on Padova, Italy; Sep. 2000.

Munich Meeting of MPEG-4 Working Group; Report ISO/IEC JTC1/SC29/WG11 MPEG4/N1172; International Organization for Standardization — Organisation Internationale de Normalisation, 1996; pp. 3-49.

R. J. Clark; Providing Scalable Web Service Using Multicast Delivery; Georgia Institute of Technology, Atlanta, GA; 1995.

Eddy De Greef, Francky Catthoor, Hugo De Man; Memory Size Reduction Through Storage Order Optimization for Embedded Parallel Multimedia Applications; Catholic University, Lewen, Belgium; Oct. 1996.

Woo Hyong Lee, J. Morris Chang, and Yusuf Hasan; Evaluation of a High-Performance Object Reuse Dynamic Memory Alloation Policy for C++ Programs; Illinois Institute of Technology, Chicago, IL; 2000.

* cited by examiner

DYNAMIC GENERATION OF MULTIMEDIA CODE FOR IMAGE PROCESSING

BACKGROUND OF THE INVENTION

1. Field of the Invention

The invention relates to the processing of multimedia data with processors that feature multimedia instruction enhanced instruction sets. More particularly, the invention relates to a method and apparatus for generating processor instruction sequences for image processing routines that use multimedia enhanced instructions.

2. Description of the Prior Art

In general, most programs that use image processing routines with multimedia instructions do not use a general-purpose compiler for these parts of the program. These programs typically use assembly routines to process such data. A resulting problem is that the assembly routines must be added to the code manually. This step requires high technical skill, is time demanding, and is prone to introduce errors into the code.

In addition, different type of processors, (for example, Intel's Pentium I w/MMX and Pentium II, Pentium III, Willamette, AMD's K-6 and AMD's K-7 aka. Athlon) each use different multimedia command sets. Examples of different multimedia command sets are MMX, SSE and 3DNow. Applications that use these multimedia command sets must have separate assembly routines that are specifically written for each processor type.

At runtime, the applications select the proper assembly routines based on the processor detected. To reduce the workload and increase the robustness of the code, these assembly routines are sometimes generated by a routine specific source code generator during program development.

One problem with this type of programming is that the applications must have redundant assembly routines which can process the same multimedia data, but which are written for the different types of processors. However, only one assembly routine is actually used at runtime. Because there are many generations of processors in existence, the size of applications that use multimedia instructions must grow to be compatible with all of these processors. In addition, as new processors are developed, all new routines must be coded for these applications so that they are compatible with the new processors. An application that is released prior to the release of a processor is incompatible with the processor unless it is first patched/rebuilt with the new assembly routines.

It would be desirable to provide programs that use multimedia instructions which are smaller in size. It would be desirable to provide an approach that adapts such programs to future processors more easily

SUMMARY OF THE INVENTION

In accordance with the invention, a method and apparatus for generating assembly routines for multimedia instruction enhanced data is shown and described.

An example of multimedia data that can be processed by multimedia instructions are the pixel blocks used in image processing. Most image processing routines operate on rectangular blocks of evenly sized data pieces (e.g. 16×16 pixel blocks of 8 bit video during MPEG motion compensation). The image processing code is described as a set of source blocks, destination blocks and data manipulations. Each block has a start address, a pitch (distance in bytes between two consecutive lines) and a data format. The full processing code includes width and height as additional parameters. All of these parameters can either be integer constants or arguments to the generated routine. All data operations are described on SIMD data types. A SIMD data type is a basic data type (e.g. signed byte, signed word, or unsigned byte) and a number or repeats (e.g. 16 pixels for MPEG Macroblocks). The size of a block (source or destination) is always the size of its SIMD data type times its width in horizontal direction and the height in vertical direction.

In the presently preferred embodiment of the invention, an abstract image generator inside the application program produces an abstract routine representation of the code that operates on the multimedia data using SIMD operations. A directed acyclic graph is a typical example of a generic version. A translator then generates processor specific assembly code from the abstract respresentation.

DESCRIPTION OF THE PREFERRED EMBODIMENT

Figure 1:
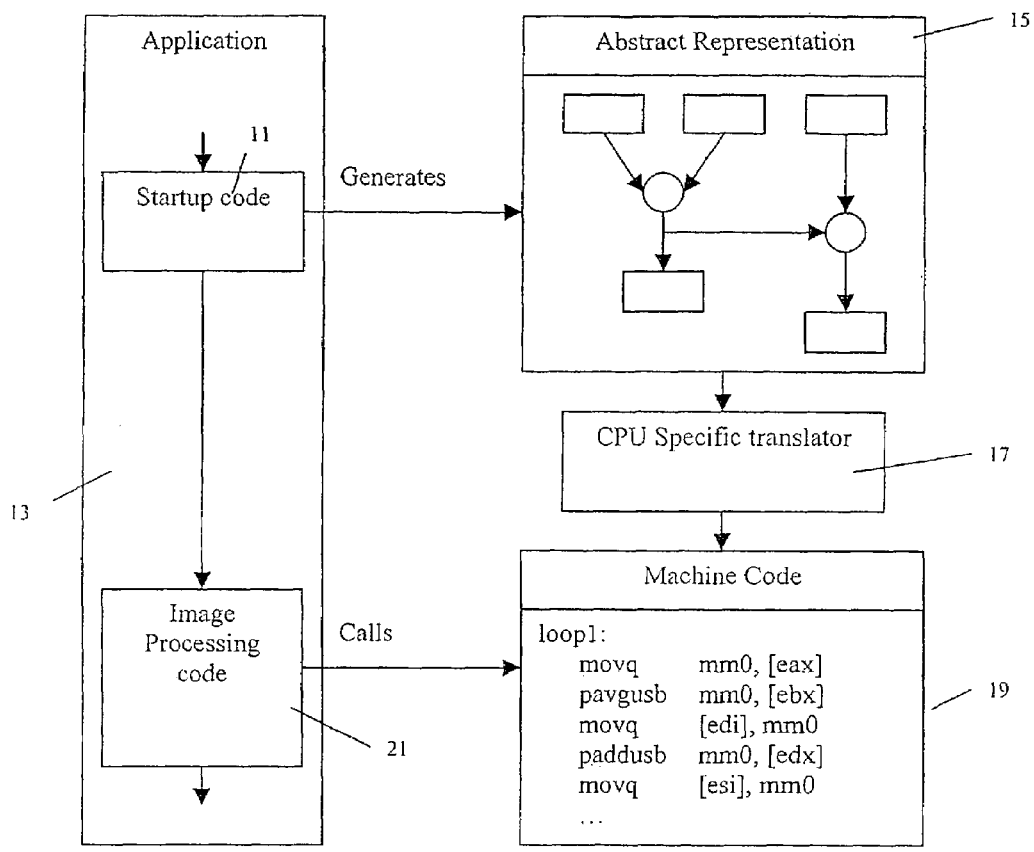
FIG. 1 is a block diagram of a computer system that may be used to implement a method and apparatus embodying the invention for translating a multimedia routine from its abstract representation generated by an abstract routine generator inside the application's startup code into executable code using the code generator.

In FIG. 1 the startup code 11 of the application program 13, further referred to as the abstract routine generator, generates an abstract representation 15 of the multimedia routine represented by a data flow graph. This graph is then translated by the code generator 17 into a machine specific sequence of instructions 19, typically including several SIMD multimedia instructions. The types of operations that can be present inside the data flow graph include add, sub, multiply, average, maximum, minimum, compare, and, or, xor, pack, unpack and merge operations. This list is not exhaustive as there are operations currently performed by MMX, SSE and 3DNow for example, which are not listed. If a specific command set does not support one of these operations, the CPU specific part of the code generator replaces it by a sequence of simpler instructions (e.g. the maximum instruction can be replaced by a pair of subtract and add instruction using saturation arithmetic).

The abstract routine generator generates an abstract representation of the code, commonly in the form of a directed acyclic graph during runtime. This allows the creation of multiple similar routines using a loop inside the image processing code 21 for linear arrays, or to generate routines on the fly depending on user interaction. E.g. the bi-directional MPEG 2 motion compensation can be implemented using a set of sixty-four different but very similar routines, that can be generated by a loop in the abstract image generator. Or an interactive paint program can generate filters or pens in the form of abstract representations based on user input, and can use the routine generator to create efficient code sequences to perform the filtering or drawing operation. Examples of the data types processed by the code sequences include: SIMD input data, image input data and audio input data.

Examples of information provided by the graphs include the source blocks, the target blocks, the change in the block, color, stride, change in stride, display block, and spatial filtering.

The accuracy of the operation inside the graphs can be tailored to meet the requirements of the program. The abstract routine generator can increase its precision by increasing the level of arithmetics per pixel. For example, 7-bit processing can be stepped up to 8-bit, or 8-bit to 16-bit. E.g. motion compensation routines with different types of rounding precision can be generated by the abstract routine generator.

The abstract representation, in this case the graph 15, is then sent to the translator 17 where it is translated into optimized assembly code 19. The translator uses standard compiler techniques to translate the generic graph structure into a specific sequence of assembly instructions. As the description is very generic, there is no link to a specific processor architecture, and because it is very simple it can be processed without requiring complex compiler techniques. This enables the translation to be executed during program startup without causing a significant delay. Also, the abstract generator and the translator do not have to be programmed in assembly. The CPU specific translator may reside in a dynamic link library and can therefore be replaced if the system processor is changed. This enables programs to use the multimedia instructions of a new processor, without the need to be changed.

Tables A–C provide sample code that generates an abstract representation for a motion compensation code that can be translated to an executable code sequence using the invention.

TABLE A

```
#ifndef MPEG2MOTIONCOMPENSATION_H
#define MPEG2MOTIONCOMPENSATION_H
#include "driver\softwarecinemaster\common\prelude.h"
#include "..\..\BlockVideoProcessor\BVPXMMXCodeConverter.h"
    //
    // Basic block motion compensation functions
    //
class MPEG2MotionCompensation
    {
    protected:
        //
        // Function prototype for a unidirectional motion compensation routine
        //
        typedef void (__stdcall * CompensationCodeType) (BYTE * source1Base, int sourceStride,
                                    BYTE * targetBase, short * deltaBase, int deltaStride, int num);
        //
        // Function prototype for a bidirectional motion compensation routine
        //
        typedef void (__stdcall * BiCompensationCodeType) (BYTE * source1Base, BYTE * source2Base, int sourceStride,
                                    BYTE * targetBase, short * deltaBase, int deltaStride, int num);
        //
        // Motion compensation routines for unidirectional prediction. Each routine
        // handles one case. The indices are
        // - y-uv    : if it is luma data the index is 0 otherwise 1
        // - delta   : error correction data is present (eg. the block is not skipped)
        // - halfy   : half pel prediction is to be performed in vertical direction
        // - halfx   : half pel prediction is to be performed in horizontal direction
        //
        CompensationCodeType        compensation[2] [2] [2] [2];        // y-uv delta halfy halfx
        BVPCodeBlock                * compensationBlock[2] [2] [2] [2];
        //
        // Motion compensation routines for bidirectional prediction. Each routine
        // handles one case. The indices contain the same parameters as in the
        // unidirectional case, plus the half pel selectors for the second source
        //
        BiCompensationCodeType      bicompensation[2] [2] [2] [2] [2] [2];  // y-uv delta half1y half1x half2y half2x
        BVPCodeBlock                * bicompensationBlock[2] [2] [2] [2] [2] [2];
    public:
        //
        // Perform a unidirectional compensation
        //
        void MotionCompensation(BYTE * sourcep, int stride, BYTE * destp, short * deltap, int dstride, int num, bool uv, bool delta, int halfx,
int halfy)
            {
            compensation[uv] [delta] [halfy] [halfx] (sourcep, stride, destp, deltap, dstride, num);
            }
        //
        // Perform bidirectional compensation
        //
        void BiMotionCompensation(BYTE * source1p, BYTE * source2p, int stride, BYTE * destp, short * deltap, int dstride, int num, bool uv,
bool delta, int half1x, int half1y, int half2x, int half2y)
            {
        bicompensation[uv] [delta] [half1y] [half1x] [half2y] [half2x] (source1p, source2p, stride, destp, deltap, dstride, num);
            }
        MPEG2MotionCompensation(void);
        ~MPEG2MotionCompensation(void);
    };
#endif
```

TABLE B

```
#include "MPEG2MotionCompensation.h"
#include ". . \ . . \BlockVideoProcessor\BVPXMMXCodeConverter.h"
    //
    // Create the dataflow to fetch a data element from a source block,
    // with or without half pel compensation in horizontal and/or
    // vertical direction.
    //
BVPDataSourceInstruction * BuildBlockMerge(BVPSourceBlock *
source1BlockA,
                            BVPSourceBlock * source1BlockB,
                            BVPSourceBlock * source1BlockC,
                            BVPSourceBlock * source1BlockD,
                            int halfx, int halfy)
    {
    if (halfy)
        {
        if (halfx)
            {
            //
            // Half pel prediction in h and v direction, the graph part
looks like this
            //                            ,---(LOAD source1BlockA)
            //                            /
            //                 ,---(AVG)
            //                 /          \
            //                 /           `---(LOAD source1BlockB)
            //   <----(AVG)
            //                 \           ,---(LOAD source1BlockC)
            //                 \          /
            //                  `---(AVG)
            //                            \
            //                             `---(LOAD source1BlockD)
            //
            return new BVPDataOperation
                (
                BVPDO_AVG,
                new BVPDataOperation
                    (
                    BVPDO_AVG,
                    new BVPDataLoad(source1BlockA),
                    new BVPDataLoad(source1BlockB)
                    ),
                new BVPDataOperation
                    (
                    BVPDO_AVG,
                    new BVPDataLoad(source1BlockC),
                    new BVPDataLoad(source1BlockD)
                    )
                );
            }
        else
            {
            //
            // Half pel prediction in vertical direction
            //
            //                  ,----(LOAD source1BlockA)
            //                 /
            //   <---- (AVG)
            //                 \
            //                  `----(LOAD source1BlockC)
            //
            return new BVPDataOperation
                (
                BVPDO_AVG,
                new BVPDataLoad(source1BlockA),
                new BVPDataLoad(source1BlockC)
                );
            }
        }
    else
        {
        if (halfx)
            {
            //
            // Half pel prediction in horizontal direction
```

TABLE B-continued

```
        //
        //              ┌----(LOAD source1BlockA)
        //              │
        //    ◄---(AVG)
        //              │
        //              └----(LOAD source1BlockB)
        //
        return new BVPDataOperation
                (
                BVPDO_AVG,
                new BVPDataLoad(source1BlockA),
                new BVPDataLoad(source1BlockB)
                );
        }
    else
        {
        //
        // Full pel prediction
        //
        // <-- (LOAD source1BlockA)
        //
        return new BVPDataLoad(source1BlockA);
        }
    }
}
MPEG2MotionCompensation::MPEG2MotionCompensation(void)
{
int yuv, delta, halfy, halfx, half1y, half1x, half2y, half2x;
BVPBlockProcessor * bvp;
BVPCodeBlock    * code;
BVPArgument * source1Base;
BVPArgument * source2Base;
BVPArgument * sourceStride;
BVPArgument * targetBase;
BVPArgument * deltaBase;
BVPArgument * deltaStride;
BVPArgument * height;
BVPSourceBlock * source1BlockA;
BVPSourceBlock * source1BlockB;
BVPSourceBlock * source1BlockC;
BVPSourceBlock * source1BlockD;
BVPSourceBlock * source2BlockA;
BVPSourceBlock * source2BlockB;
BVPSourceBlock * source2BlockC;
BVPSourceBlock * source2BlockD;
BVPSourceBlock * deltaBlock;
BVPTargetBlock * targetBlock;
BVPDataSourceInstruction * postMC;
BVPDataSourceInstruction * postCorrect;
BVPDataSourceInstruction * deltaData;
//
// Build unidirectional motion compensation routines
//
for (yuv = 0; yuv<2; yuv++)
    {
    for(delta=0; delta<2; delta++)
        {
        for(halfy=0; halfy<2; halfy++)
            {
            for(halfx=0; halfx<2; halfx++)
                {
                bvp = new BVPBlockProcessor( );
                bvp->AddArgument(height       = new BVPArgument(false));
                bvp->AddArgument(deltaStride  = new BVPArgument(false));
                bvp->AddArgument(deltaBase    = new BVPArgument(true));
                bvp->AddArqument(targetBase   = new BVPArgument(true));
                bvp->AddArqument(sourceStride = new BVPArgument(false));
                bvp->AddArgument(source1Base  = new BVPArgument(true));
                //
                // Width is always sixteen pixels, so one vector of sixteen
unsigned eight bit elements,
                // height may vary, therefore it is an argument
                //
                bvp->SetDimension(1, height);
                //
                // Four potential source blocks, B is one pel to the right,
C one down and D right and down
                //
                bvp->AddSourceBlock(source1BlockA = new
```

TABLE B-continued

```
BVPSourceBlock(source1Base,
sourceStride, BVPDataFormat(BVPDT_U8, 16), 0x10000));
                bvp->AddSourceBlock(source1BlockB = new
BVPSourceBlock(BVPPointer(source1Base, 1 + yuv),
sourceStride, BVPDataFormat(BVPDT_U8, 16), 0x10000));
                bvp->AddSourceBlock(source1BlockC = new
BVPSourceBlock(BVPPointer(source1Base, sourceStride, 1, 0),
sourceStride, BVPDataFormat(BVPDT_U8, 16), 0x10000));
                bvp->AddSourceBlock(source1BlockD = new
BVPSourceBlock(BVPPointer(source1Base, sourceStride, 1, 1 + yuv),
sourceStride, BVPDataFormat(BVPDT_U8, 16), 0x10000));
                //
                // If we have error correction data, we need this source
block as well
                //
                if (delta)
                    bvp->AddSourceBlock(deltaBlock = new
BVPSourceBlock(deltaBase, deltaStride, BVPDataFormat(BVPDT_S16, 16),
0x10000));
                //
                // The target block to write the data into
                //
                bvp->AddTargetBlock(targetBlock = new
BVPTargetBlock(targetBase, sourceStride, BVPDataFormat(BVPDT_U8, 16),
0x10000));
                //
                // Load a source block base on the half pel settings
                //
                bvp->AddInstruction(postMC = BuildBlockMerge(source1BlockA,
source1BlockB, source1BlockC, source1BlockD, halfx, halfy));
                if (delta)
                    {
                    deltaData = new BVPDataLoad(deltaBlock);
                    if (yuv)
                        {
                        //
                        // It is chroma data and we have error correction data.
The u and v
                        // parts have to be interleaved, therefore we need the
merge instruction
                        //
                        //
                        //                   ,---(CONV S16)◄---postMC
                        //                  /
                        //  ◄---(CONV U8)◄---(ADD)       ,--(SPLIT H)◄--,
                        //                  \           /               )
                        //                   `--(MERGE OE)
                        //                              `--(SPLIT T)◄-- Y
                        //  ◄--(LOAD delta)
                        //
                        //
                        //
                        bvp->AddInstruction
                            (
                            postCorrect =
                            new BVPDataConvert
                                (
                                BVPDT_U8,
                                new BVPDataOperation
                                    (
                                    BVPDO_ADD,
                                    new BVPDataConvert
                                        (
                                        BVPDT_S16,
                                        postMC
                                        ),
                                    new BVPDataMerge
                                        (
                                        BVPDM_ODDEVEN,
                                        new BVPDataSplit
                                            (
                                            BVPDS_HEAD,
                                            deltaData
                                            ),
                                        new BVPDataSplit
                                            (
                                            BVPDS_TAIL,
                                            deltaData
                                            )
                                        )
```

TABLE B-continued

```
                    )
                  )
                );
              }
            else
              {
              //
              // It is luma data with error correction
              //
              //                              ,---(CONV S16)◄---postMC
              //                             /
              // ◄---(CONV U8)◄---(ADD)
              //                             \
              //                              `---(LOAD delta)
              //
              bvp->AddInstruction
                  (
                  postCorrect =
                  new BVPDataConvert
                      (
                      BVPDT_U8,
                      new BVPDataOperation
                          (
                          BVPDO_ADD,
                          new BVPDataConvert
                              (
                              BVPDT_S16,
                              postMC
                              ),
                          deltaData
                          )
                      )
                  );
              }
            //
            // Store into the target block
            //
            // (STORE targetBlock) <-- . . .
            //
            bvp->AddInstruction
                (
                new BVPDataStore
                    (
                    targetBlock,
                    postCorrect
                    )
                );
            }
          else
            {
            //
            // No error correction data, so store motion result into
target block
            //
            // (STORE targetBlock) <-- . . .
            //
            bvp->AddInstruction
                (
                new BVPDataStore
                    (
                    targetBlock,
                    postMC
                    )
                );
            }
          BVPXMMXCodeConverter conv;
          //
          // Convert graph into machine language
          //
            compensationBlock[yuv] [delta] [halfy] [halfx] = code =
conv.Convert(bvp);
          //
          // Get function entry pointer
          //
            compensation[yuv] [delta] [halfy] [halfx] =
(CompensationCodeType) (code->GetCodeAddress( ));
          //
          // delete graph
          //
```

TABLE B-continued

```
                        delete bvp;
                    }
                }
            }
        }
    //
    // build motion compensation routines for bidirectional prediction
    //
    for(yuv = 0; yuv<2; yuv++)
        {
        for(delta=0; delta<2; delta++)
            {
            for(half1y=0; half1y<2; half1y++)
                {
                for(half1x=0; half1x<2; half1x++)
                    {
                    for(half2y=0; half2y<2; half2y++)
                        {
                        for(half2x=0; half2x<2; half2x++)
                            {
                            bvp = new BVPBlockProcessor( );
                            bvp->AddArgument(height       = new BVPArgument(false));
                            bvp->AddArgument(deltaStride  = new BVPArgument(false));
                            bvp->AddArgument(deltaBase    = new BVPArgument(true));
                            bvp->AddArgument(targetBase   = new BVPArgument(true));
                            bvp->AddArgument(sourceStride = new BVPArgument(false));
                            bvp->AddArgument(source2Base  = new BVPArgument(true));
                            bvp->AddArgument(source1Base  = new BVPArgument(true));
                            bvp->SetDimension(1, height);
                            //
                            // We now have two source blocks, so we need eight blocks for the half pel
                            // prediction
                            //
                            bvp->AddSourceBlock(source1BlockA = new BVPSourceBlock(source1Base,
                                sourceStride, BVPDataFormat(BVPDT_U8, 16), 0x10000));
                            bvp->AddSourceBlock(source1BlockB = new BVPSourceBlock(BVPPointer(source1Base, 1 + yuv),
                                sourceStride, BVPDataFormat(BVPDT_U8, 16), 0x10000));
                            bvp->AddSourceBlock(source1BlockC = new BVPSourceBlock(BVPPointer(source1Base, sourceStride, 1, 0),
                                sourceStride, BVPDataFormat(BVPDT_U8, 16), 0x10000));
                            bvp->AddSourceBlock(source1BlockD = new BVPSourceBlock(BVPPointer(source1Base, sourceStride, 1, 1 + yuv),
                                sourceStride, BVPDataFormat(BVPDT_U8, 16), 0x10000));
                            bvp->AddSourceBlock(source2BlockA = new BVPSourceBlock(source2Base,
                                sourceStride, BVPDataFormat(BVPDT_U8, 16), 0x10000));
                            bvp->AddSourceBlock(source2BlockB = new BVPSourceBlock(BVPPointer(source2Base, 1 + yuv),
                                sourceStride, BVPDataFormat(BVPDT_U8, 16), 0x10000));
                            bvp->AddSourceBlock(source2BlockC = new BVPSourceBlock(BVPPointer(source2Base, sourceStride, 1, 0),
                                sourceStride, BVPDataFormat(BVPDT_U8, 16), 0x10000));
                            bvp->AddSourceBlock(source2BlockD = new BVPSourceBlock(BVPPointer(source2Base, sourceStride, 1, 1 + yuv),
                                sourceStride, BVPDataFormat(BVPDT_U8, 16), 0x10000));
                            if (delta)
                                bvp->AddSourceBlock(deltaBlock = new BVPSourceBlock(deltaBase, deltaStride, BVPDataFormat(BVPDT_S16, 16),
                                    0x10000));
                            bvp->AddTargetBlock(targetBlock = new BVPTargetBlock(targetBase, sourceStride, BVPDataFormat(BVPDT_U8, 16),
                                0x10000));
                            //
                            // Build bidirectional prediction from two unidirectional predictions
```

TABLE B-continued

```
//
//                    ,---BuildBlockMerge (source1Block*)
//                   /
//  ◄---(AVG)
//                   \
//                    `---BuildBlockMerge (source2Block*)
//
                bvp->AddInstruction
                    (
                    postMC =
                    new BVPDataOperation
                        (
                        BVPDO_AVG,
                        BuildBlockMerge(source1BlockA, source1BlockB,
source1BlockC, source1BlockD, half1x, half1y),
                        BuildBlockMerge(source2BlockA, source2BlockB,
source2BlockC, source2BlockD, half2x, half2y)
                        )
                    );
//
// Apply error correction, see unidirectional case
//
                if (delta)
                    {
                    deltaData = new BVPDataLoad(deltaBlock);
                    if (yuv)
                        {
                        bvp->AddInstruction
                            (
                            postCorrect =
                            new BVPDataConvert
                                (
                                BVPDT_U8,
                                new BVPDataOperation
                                    (
                                    BVPDO_ADD,
                                    new BVPDataConvert
                                        (
                                        BVPDT_S16,
                                        postMC
                                        ),
                                    new BVPDataMerge
                                        (
                                        BVPDM_ODDEVEN,
                                        new BVPDataSplit
                                            (
                                            BVPDS_HEAD,
                                            deltaData
                                            ),
                                        new BVPDataSplit
                                            (
                                            BVPDS_TAIL,
                                            deltaData
                                            )
                                        )
                                    )
                                )
                            );
                        }
                    else
                        {
                        bvp->AddInstruction
                            (
                            postCorrect =
                            new BVPDataConvert
                                (
                                BVPDT_U8,
                                new BVPDataOperation
                                    (
                                    BVPDO_ADD,
                                    new BVPDataConvert
                                        (
                                        BVPDT_S16,
                                        postMC
                                        ),
                                    deltaData
                                    )
                                )
                            );
```

TABLE B-continued

```
                    }
                    bvp->AddInstruction
                        (
                        new BVPDataStore
                            (
                            targetBlock,
                            postCorrect
                            )
                        );
                    }
                else
                    {
                    bvp->AddInstruction
                        (
                        new BVPDataStore
                            (
                            targetBlock,
                            postMC
                            )
                        );
                    }
                BVPXMMXCodeConverter conv;
                //
                // Translate routines
                //
    bicompensationBlock[yuv] [delta] [halfly] [halflx] [half2y] [half2x] =
code = conv.Convert(bvp);
    bicompensation[yuv] [delta] [halfly] [halflx] [half2y] [half2x] =
(BiCompensationCodeType) (code->GetCodeAddress( ));
                    delete bvp;
                    }
                }
            }
        }
    }
}
MPEG2MotionCompensation::~MPEG2MotionCompensation(void)
    {
    int yuv, delta, halfy, halfx, halfly, halflx, half2y, half2x;
    //
    // free all motion compensation routines
    //
    for(yuv = 0; yuv<2; yuv++)
        {
        for(delta=0; delta<2; delta++)
            {
            for(halfy=0; halfy<2; halfy++)
                {
                for(halfx=0; halfx<2; halfx++)
                    {
                    delete compensationBlock[yuv] [delta] [halfy] [halfx];
                    }
                }
            }
        }
    for(yuv = 0; yuv<2; yuv++)
        {
        for(delta=0; delta<2; delta++)
            {
            for(halfly=0; halfly<2; halfly++)
                {
                for(halflx=0; halflx<2; halflx++)
                    {
                    for(half2y=0; half2y<2; half2y++)
                        {
                        for(half2x=0; half2x<2; half2x++)
                            {
                            delete
bicompensationBlock[yuv] [delta] [halfly] [halflx] [half2y] [half2x];
                            }
                        }
                    }
                }
            }
        }
    }
```

TABLE C

```
#ifndef BVPGENERIC_H
#define BVPGENERIC_H
#include "BVPList.h"
    //
    // Argument descriptor. An argument can be either a pointer or an integer used
    // as a stride, offset or width/height value.
    //
class BVPArgument
    {
    public:
        bool    pointer;
        int     index;
        BVPArgument(bool pointer_)
            : pointer(pointer_), index(0) { }
    };
    //
    // Description of an integer value used as a stride or offset. An integer value
    // can be either an argument or a constant
    //
class BVPInteger
    {
    public:
        int             value;
        BVPArgument   * arg;
        BVPInteger(void)
            : value(0), arg(NULL) { }
        BVPInteger(int value_)
            : value(value_), arg(NULL) { }
        BVPInteger(unsigned value_)
            : value((int)value_), arg(NULL) { }
        BVPInteger(BVPArgument * arg_)
            : value(0), arg(arg_) { }
        bool operator== (BVPInteger i2)
            {
            return arg ? (i2.arg == arg) : (i2.value == value);
            }
    };
    //
    // Description of a memory pointer used as a base for source and target blocks.
    // A pointer can be a combination of an pointer base, a constant offset and
    // a variable index with scaling
    //
class BVPPointer
    {
    public:
        BVPArgument   * base;
        BVPArgument   * index;
        int             offset;
        int             scale;
        BVPPointer(BVPArgument * base_)
            : base(base_), index(NULL), offset(0), scale(0) { }
        BVPPointer(BVPPointer base_, int offset_)
            : base(base_.base), index(NULL), offset(offset_), scale(0) { }
        BVPPointer(BVPPointer base_, BVPInteger index_, int scale_, int offset_)
            : base(base_.base), index(index_.arg), offset(offset_), scale(scale_) { }
    };
    //
    // Base data formats for scalar types
    //
enum BVPBaseDataFormat
    {
    BVPDT_U8,       // Unsigned 8 bits
    BVPDT_U16,      // Unsigned 16 bits
    BVPDT_U32,      // Unsigned 32 bits
    BVPDT_S8,       // Signed 8 bits
    BVPDT_S16,      // Signed 16 bits
    BVPDT_S32       // Signed 32 bits
    };
    //
    // Data forma descriptor for scalar and vector (multimedia simd) types
    // Each data type is a combination of a base type and a vector size.
    // Scalar types are represented by a vector size of one.
    //
class BVPDataFormat
    {
    public:
        BVPBaseDataFormat   format;
        int                 num;
```

TABLE C-continued

```
        BVPDataFormat(BVPBaseDataFormat __format, int __num = 1)
            : format(__format), num(__num) { }
        BVPDataFormat(void)
            : format(BVPDT_U8), num(0) { }
        BVPDataFormat(BVPDataFormat & f)
            : format(f.format), num(f.num) { }
        BVPDataFormat operator* (int times)
            {return BVPDataFormat(format, num * times);}
        BVPDataFormat operator/ (int times)
            {return BVPDataFormat(format, num / times);}
        int BitsPerElement(void) {static const int sz[ ] = {8, 16, 32, 8, 16, 32}; return sz[format];}
        int BitsPerChunk(void) {return BitsPerElement( ) * num;}
    };
//
// Operation codes for binary data operations that have the
// same operand type for both sources and the destination
//
enum BVPDataOperationCode
    {
    BVPDO_ADD,                  // add with wraparound
    BVPDO_ADD_SATURATED,        // add with saturation
    BVPDO_SUB,                  // subtract with wraparound
    BVPDO_SUB_SATURATED,        // subtract with saturation
    BVPDO_MAX,                  // maximum
    BVPDO_MIN,                  // minimum
    BVPDO_AVG,                  // average (includes rounding towards nearest)
    BVPDO_EQU,                  // equal
    BVPDO_OR,                   // binary or
    BVPDO_XOR,                  // binary exclusive or
    BVPDO_AND,                  // binary and
    BVPDO_ANDNOT,               // binary and not
    BVPDO_MULL,                 // multiply keep lower half
    BVPDO_MULH                  // multiply keep upper half
    };
//
// Operations that extract a part of a data element
//
enum BVPDataSplitCode
    {
    BVPDS_HEAD,                 // extract first half
    BVPDS_TAIL,                 // extract second half
    BVPDS_ODD,                  // extract odd elements
    BVPDS_EVEN                  // extract even elements
    };
//
// Operations that combine to data elements
//
enum BVPDataMergeCode
    {
    BVPDM_UPPERLOWER,           // chain first and second operands
    BVPDM_ODDEVEN               // interleave first and second operands
    };
//
// Node types in the data flow graph
//
enum BVPInstructionType
    {
    BVPIT_LOAD,                 // load an element from a source block
    BVPIT_STORE,                // store an element into a source block
    BVPIT_CONSTANT,             // load a constant value
    BVPIT_SPLIT,                // split an element
    BVPIT_MERGE,                // merge two elements
    BVPIT_CONVERT,              // perform a data conversion
    BVPIT_OPERATION             // simple binary data operation
    };
//
// Descriptor of a data block. Contains a base pointer, a stride(pitch), a
// format and an incrementor in vertical direction. The vertical block position
// can be incremented by a fraction or a multiple of the given pitch.
//
class BVPBlock
    {
    public:
        BVPPointer      base;
        BVPInteger      pitch;
        BVPDataFormat   format;
        int             yscale;
        int             index;
```

TABLE C-continued

```
        BVPBlock(BVPPointer __base, BVPInteger __pitch, BVPDataFormat __format, int __yscale)
            : base(__base), pitch(__pitch), format(__format), yscale(__yscale) { }
    };
    //
    // Descriptor of a source block
    //
class BVPSourceBlock : public BVPBlock
    {
    public:
        BVPSourceBlock(BVPPointer base, BVPInteger pitch, BVPDataFormat format, int yscale)
            : BVPBlock(base, pitch, format, yscale) { }
    };
    //
    // Descriptor of a target block
    //
class BVPTargetBlock : public BVPBlock
    {
    public:
        BVPTargetBlock(BVPPointer base, BVPInteger pitch, BVPDataFormat format, int yscale)
            : BVPBlock(base, pitch, format, yscale) { }
    };
class BVPDataSource;
class BVPDataDrain;
class BVPDataInstruction;
    //
    // Source connection element of a node in the data flow graph. Each node in
    // the graph contains one or none source connection. A source connection is
    // the output of a node in the graph. Each source connection can be connected
    // to any number of drain connections in other nodes of the flow graph. The
    // source is the output side of a node.
    //
class BVPDataSource
    {
    public:
        BVPDataFormat           format;
        BVPList<BVPDataDrain *>    drain;
        BVPDataSource(BVPDataFormat __format) : format(__format) { }
        virtual void AddInstructions(BVPList<BVPDataInstruction *> & instructions) { }
        virtual BVPDataInstruction * ToInstruction(void) {return NULL;}
    };
    //
    // Drain connection element of a node in the data flow graph. Each node
    // can have none, one or two drain connections (but only one drain object
    // to represent both). Each drain connects to exactly one source on the
    // target side. As eachnode can have only two inputs, each drain is connected
    // (through the node) with two sources. The drain is the input side of a
    // node.
    //
class BVPDataDrain
    {
    public:
        BVPDataSource          * source1;
        BVPDataSource          * source2;
        BVPDataDrain(BVPDataSource * source1__, BVPDataSource * source2__ = NULL)
            : source1(source1__), source2(source2__) { }
        virtual BVPDataInstruction * ToInstruction(void) {return NULL;}
    };
    //
    // Each node in the graph represents one abstract instruction. It has an
    // instruction type that describes the operation of the node.
    //
class BVPDataInstruction
    {
    public:
        BVPInstructionType     type;
        int                    index;
        BVPDataInstruction(BVPInstructionType type__)
            : type(type__), index(-1) { }
        virtual ~BVPDataInstruction(void) { }
        virtual void AddInstructions(BVPList<BVPDataInstruction *> & instructions);
        virtual void GetOperationBits(int & minBits, int & maxBits);
        virtual BVPDataFormat GetInputFormat(void) = 0;
        virtual BVPDataFormat GetOutputFormat(void) = 0;
        virtual BVPDataSource * ToSource(void) {return NULL;}
        virtual BVPDataDrain * ToDrain(void) {return NULL;}
    };
```

TABLE C-continued

```
//
// Node that is a data source
//
class BVPDataSourceInstruction : public BVPDataInstruction, public BVPDataSource
{
    public:
        BVPDataSourceInstruction(BVPInstructionType type_, BVPDataFormat format_)
            : BVPDataInstruction(type_), BVPDataSource(format_) { }
        void GetOperationBits(int & minBits, int & maxBits);
        BVPDataFormat GetOutputFormat(void) {return format;}
        BVPDataFormat GetInputFormat(void) {return format;}
        BVPDataInstruction * ToInstruction(void) {return this;}
        BVPDataSource * ToSource(void) {return this;}
};
//
// Node that is a data source and has one or two sources connected to its drain
//
class BVPDataSourceDrainInstruction : public BVPDataSourceInstruction, public BVPDataDrain
{
    public:
        BVPDataSourceDrainInstruction(BVPInstructionType type_, BVPDataFormat format_, BVPDataSource * source1_)
            : BVPDataSourceInstruction(type_, format_), BVPDataDrain(source1_)
            {source1_->drain.Insert(this);}
        BVPDataSourceDrainInstruction(BVPInstructionType type_, BVPDataFormat format_, BVPDataSource * source1_,
BVPDataSource * source2_)
            : BVPDataSourceInstruction(type_, format_), BVPDataDrain(source1_, source2_)
            {source1_->drain.Insert(this);source2_->drain.Insert(this);}
};
//
// Instruction to load data from a source block
//
class BVPDataLoad : public BVPDataSourceInstruction
{
    public:
        BVPSourceBlock    * block;
        int               offset;
        BVPDataLoad(BVPSourceBlock * block_, int offset_ = 0)
            : BVPDataSourceInstruction(BVPIT_LOAD, block_->format), block(block_), offset(offset_) { }
        void AddInstructions(BVPList<BVPDataInstruction *> & instructions);
};
//
// Instruction to store data into a target block
//
class BVPDataStore : public BVPDataInstruction, public BVPDataDrain
{
    public:
        BVPTargetBlock    * block;
        BVPDataStore(BVPTargetBlock * block_, BVPDataSource * source)
            : BVPDataInstruction(BVPIT_STORE), BVPDataDrain(source), block(block_)
            {source->drain.Insert(this);}
        void AddInstructions(BVPList<BVPDataInstruction *> & instructions);
        BVPDataFormat GetOutputFormat(void) {return source1->format;}
        BVPDataFormat GetInputFormat(void) {return source1->format;}
        BVPDataInstruction * ToInstruction(void) {return this;}
        BVPDataDrain * ToDrain(void) {return this;}
};
//
// Instruction to load a constant
//
class BVPDataConstant : public BVPDataSourceInstruction
{
    public:
        int value;
        BVPDataConstant(BVPDataFormat format, int value_)
            : BVPDataSourceInstruction(BVPIT_CONSTANT, format), value(value_) { }
};
//
// Instruction to split a data element
//
class BVPDataSplit : public BVPDataSourceDrainInstruction
{
    public:
        BVPDataSplitCode code;
        BVPDataSplit(BVPDataSplitCode code_, BVPDataSource * source)
            : BVPDataSourceDrainInstruction(BVPIT_SPLIT, source->format / 2, source), code(code_) { }
        void AddInstructions(BVPList<BVPDataInstruction *> & instructions);
        BVPDataDrain * ToDrain(void) {return this;}
        BVPDataFormat GetInputFormat(void) {return source1->format;}
};
```

TABLE C-continued

```
//
// Instruction to merge two data elements
//
class BVPDataMerge : public BVPDataSourceDrainInstruction
    {
    public:
        BVPDataMergeCode code;
        BVPDataMerge(BVPDataMergeCode code_, BVPDataSource * source1_, BVPDataSource * source2_)
            : BVPDataSourceDrainInstruction(BVPIT_MERGE, source1_—>format * 2, source1_, source2_), code(code_) { }
        void AddInstructions(BVPList<BVPDataInstruction *> & instructions);
        BVPDataDrain * ToDrain(void) {return this;}
        BVPDataFormat GetInputFormat(void) {return source1—>format;}
    };
//
// Instruction to convert the basic vector elements of an data element into
// a different format (eg. from signed 16 bit to unsigned 8 bits).
//
class BVPDataConvert : public BVPDataSourceDrainInstruction
    {
    public:
        BVPDataConvert(BVPBaseDataFormat target, BVPDataSource * source)
            : BVPDataSourceDrainInstruction(BVPIT_CONVERT, BVPDataFormat(target, source—>format.num), source) { }
        void AddInstructions(BVPList<BVPDataInstruction *> & instructions);
        BVPDataDrain * ToDrain(void) {return this;}
        BVPDataFormat GetInputFormat(void) {return source1—>format;}
    };
//
// Basic data manipulation operation from two sources to one drain.
//
class BVPDataOperation : public BVPDataSourceDrainInstruction
    {
    public:
        BVPDataOperationCode   code;
        BVPDataOperation(BVPDataOperationCode code_, BVPDataSource * source1_, BVPDataSource * source2_)
            : BVPDataSourceDrainInstruction(BVPIT_OPERATION, source1_—>format, source1_, source2_), code(code_) { }
        void AddInstructions(BVPList<BVPDataInstruction *> & instructions);
        BVPDataDrain * ToDrain(void) {return this;}
    };
//
// Descriptor for one image block processing routine. It contains the arguments, the
// size and the dataflow graph. On destruction of the block processor all argument,
// blocks and instructions are also deleted.
//
class BVPBlockProcessor
    {
    public:
        BVPInteger     width;
        BVPInteger     height;
        BVPList<BVPBlock *> blocks;
        BVPList<BVPDataInstruction *> instructions;
        BVPList<BVPArgument *> args;
        BVPBlockProcessor(void)
            {
            }
        ~BVPBlockProcessor(void);
            //
            // Add an argument to the list of arguments. Please note that the arguments
            // are added in the reverse order of the c-calling convention.
            //
        void AddArgument(BVPArgument * arg)
            {
            arg—>index = args.Num( );
            args.Insert(arg);
            }
            //
            // Set the dimension of the operation rectangle. The width and height can
            // either be constants or arguments to the routine.
            //
        void SetDimension(BVPInteger width, BVPInteger height)
            {
            this—>width = width;
            this—>height = height;
            }
```

TABLE C-continued

```
    //
    // Add a source block to the processing
    //
    void AddSourceBlock(BVPSourceBlock * block)
        {
        block—>index = blocks.Num( );
        blocks.Insert(block);
        }
    //
    // Add a target block to the processing
    //
    void AddTargetBlock(BVPTargetBlock * block)
        {
        block—>index = blocks.Num( );
        blocks.Insert(block);
        }
    //
    // Add an instruction to the dataflow graph. All referenced instructions
    // will also be added to the graph if they are not yet part of it.
    //
    void AddInstruction(BVPDataInstruction * ins)
        {
        ins—>AddInstructions(instructions);
        }
    void GetOperationBits(int & minBits, int & maxBits);
    };
#endif
```

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

The invention claimed is:

1. An apparatus for generating processor-specific multimedia routines dynamically, comprising:
   a computer; and
   an image processing program executing on said computer, said program including multimedia enhanced instructions for processing image data;
   an abstract routine generator within said image processing program for receiving a data stream comprising an image-processing routine that includes multimedia enhanced instructions and for outputting a non-processor-specific abstract representation thereof at program startup; and
   a translator within said image processing program for said abstract routine generator for receiving said abstract representation and for outputting processor-specific final code translated from said non-processor-specific abstract representation for processing multimedia input data at program startup.

2. The apparatus of claim 1, wherein said abstract routine generator builds an abstract routine during program runtime.

3. The apparatus of claim 1, wherein said abstract routine generator builds an abstract routine in the form of a graph.

4. The apparatus of claim 3, wherein said graph is input to said translator.

5. The apparatus of claim 3, wherein the output of said translator is in assembly code.

6. The apparatus of claim 3, wherein said graph is a function of any of source block, target block, change in the block, color, stride, change in stride, display block, and spatial filtering.

7. The apparatus of claim 1 wherein said image data comprise SIMD input data.

8. The apparatus of claim 1, wherein said image data comprise image input data.

9. The apparatus of claim 1, wherein said processor-specific code performs any of the operations of add, sub, multiply, average, maximum, minimum, compare, and, or, xor, pack, unpack, and merge on said input data.

10. A method for generating processor-specific multimedia routines dynamically, comprising:
    providing a computer; and
    an image processing program executing on said computer, said program including multimedia enhanced instructions for processing image data;
    an abstract routine generator within said image processing program for receiving a data stream comprising an image-processing routine that includes multimedia enhanced instructions and for outputting a non-processor-specific abstract representation thereof at program startup; and
    a translator within said image processing program for said abstract routine generator for receiving said abstract representation; and
    outputting processor-specific final code translated from said non-processor-specific abstract representation for processing multimedia input data at program startup.

11. The method of claim 10, wherein said abstract routine generator builds the abstract routine during program runtime.

12. The method of claim 11, wherein said abstract routine is a graph.

13. The method of claim 12, wherein said graph is input to said translator.

14. The method of claim 12, wherein said graph is a function of any of source block, target block, change in the block, color, stride, change in stride, display block, and spatial filtering.

15. The method of claim 10, wherein said image data comprise SIMD data.

16. The method of claim 10, said image data comprise image input data.

17. The method of claim 10, wherein the output of said translator is assembly code.

18. The method of claim 10, wherein said processor-specific code performs any of the operations of add, sub, multiply, average, maximum, minimum, compare, and, or, xor, pack, unpack, and merge on said multimedia input data.

* * * * *